INVENTOR
GEORGE H. KUNSTADT
BY Elmer J. Gorn
ATTORNEY

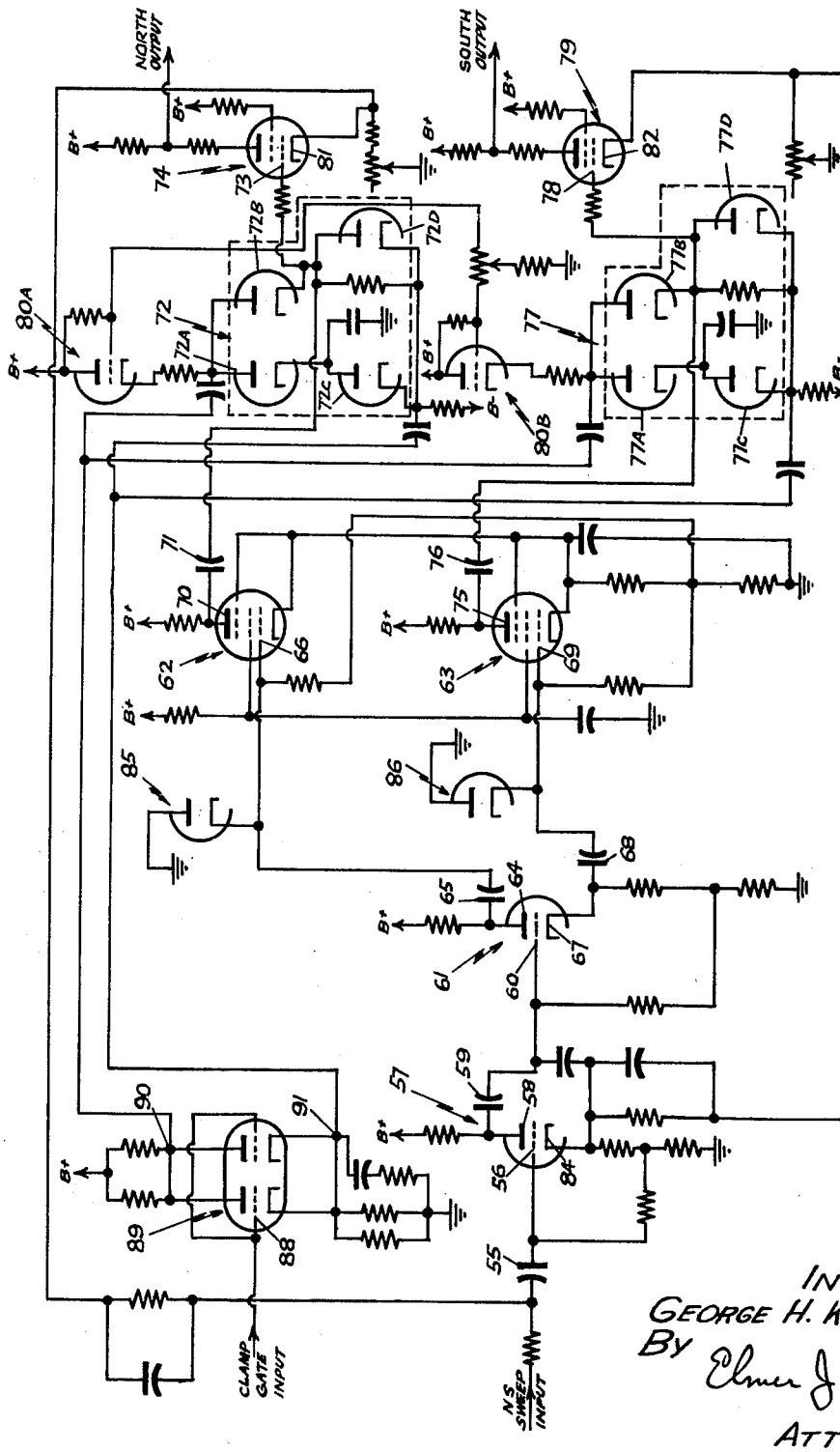

United States Patent Office 2,892,961
Patented June 30, 1959

2,892,961

SWEEP AMPLIFIERS

George H. Kunstadt, Watertown, Mass., assignor to Raytheon Manufacturing Company, Waltham, Mass., a corporation of Delaware Application December 14, 1954, Serial No. 475,218

9 Claims. (Cl. 315—27)

This invention relates to a class B feedback amplifier and, in particular, to a class B feedback amplifier designed to drive the deflection coil in a fixed coil plan position indicator system, henceforth to be called P.P.I. system.

The design of modern radar indicators has called for the use of low inductance deflection coils, due to the relatively fast sweep speeds used. Such coils have a low deflection sensitivity and therefore impose severe current requirements on the deflection coil driver stage. Heretofore, conventional fixed coil systems were designed for class A operation which used four equal currents, the magnitude of each being one-half the current required to deflect the beam to one radius. These currents of necessity were continuous in the north, south, east and west coils of the deflection yoke. In order to deflect the electron beam, it is necessary to increase the current in one coil and decrease the current in the opposite coil by a like amount. Such amplifiers, in order to supply the high output currents needed, employ many power output stages.

The present invention discloses a sweep amplifier that operates class B in the power output stage. It will be seen that, depending on the duty cycle, the average power dissipated in the output stages is reduced by a large ratio.

The power saved by using class B sweep amplifiers can be illustrated by assuming a situation having the following constants:

Coil deflection sensitivity of 200 milliamps per radius;
Conversion factor of $12.2 \times 10^{-6}$ seconds for a pulse to travel one radar mile;
Sweep range 20 miles;
Pulse repetition rate of 650 cycles per second; and
A supply voltage of 300 volts.

For class A operation, the total power supply drain is:

$$4 \times 100 = 400 \text{ milliamps} \quad (1)$$

$$\text{Power} = 400 \text{ milliamps} \times 300 \text{ volts} = 120 \text{ watts} \quad (2)$$

It will be noted that for class A operation, the total power drain is 120 watts at all times.

For class B operation, the quiescent current in all four tubes may add up to 40 milliamps. In addition, the 20-mile sawtooth deflection current in one tube amounts to:

$$\frac{\text{Area of pulse (current} \times \text{time)}}{\text{Time for one pulse (time)}} = \text{average current} \quad (2A)$$

$$200 \times \frac{1}{2} \times \frac{20 \times 12.2 \times 10^{-6}}{\frac{1}{650}} = 15.8 \text{ ma.} \quad (3)$$

Total current = 15.8 ma. + 40 ma. = 55.8 ma.

Power = 55.8 milliamps × 300 volts = 16.7 watts (4)

The large power ratio of $$\frac{120}{16.7} \text{ or } 7.2:1$$

represents the reduced power necessary in the final stage of a class B sweep power amplifier as opposed to a class A sweep power amplifier.

The manner in which the feedback signals are derived constitutes another special feature of this circuit. Depending on whether the desired sweep deflection is up or down, either one or the other output tube carries all of the deflection current. The input being single-ended, feedback from one output connects to the grid and feedback from the other output connects to the cathode, both feedbacks going to the first amplifier stage. The feedback resistors are proportioned to give equal gain in both positive and negative directions.

An object of this invention, therefore, is to provide a class B sweep amplifier adaptable for use in a P.P.I. presentation.

Another object of this invention is to provide a sweep amplifier that requires substantially less power in the final stage for a given deflection than has heretofore been used.

A still further object is to provide a sweep amplifier having novel arrangements of feedback from the final stage to the first stage in order to have equal gain in both positive and negative directions.

Another object is to accomplish the aforesaid in a cheap and reliable manner using a minimum of components.

Further objects and advantages of this invention will be apparent as the description progresses, reference being made to the accompanying drawings, wherein:

Fig. 4 is a schematic diagram of the embodiment illustrated in Fig. 3.

Figure 1:
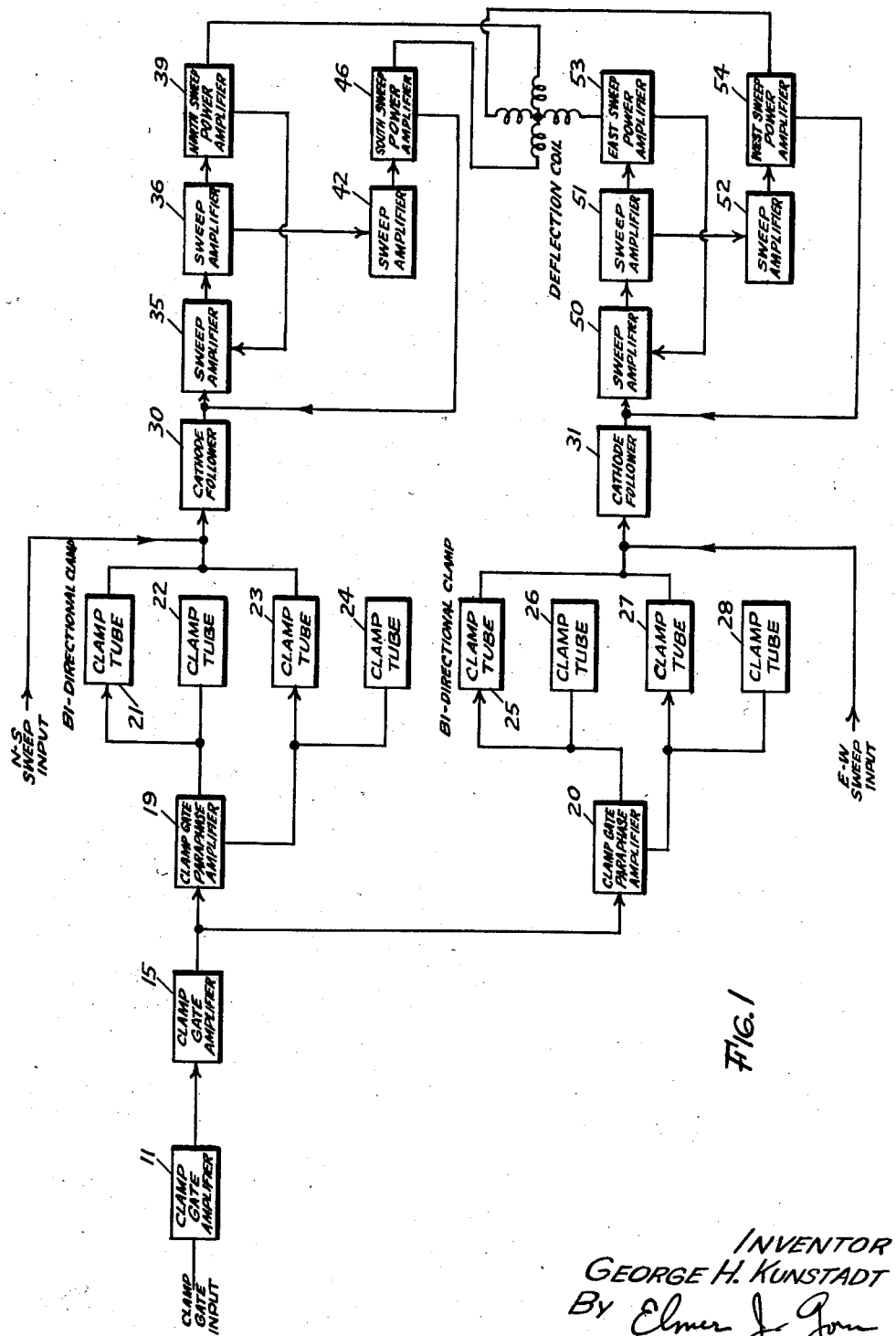
Fig. 1 is a block diagram of an embodiment of the invention.
Figure 2:
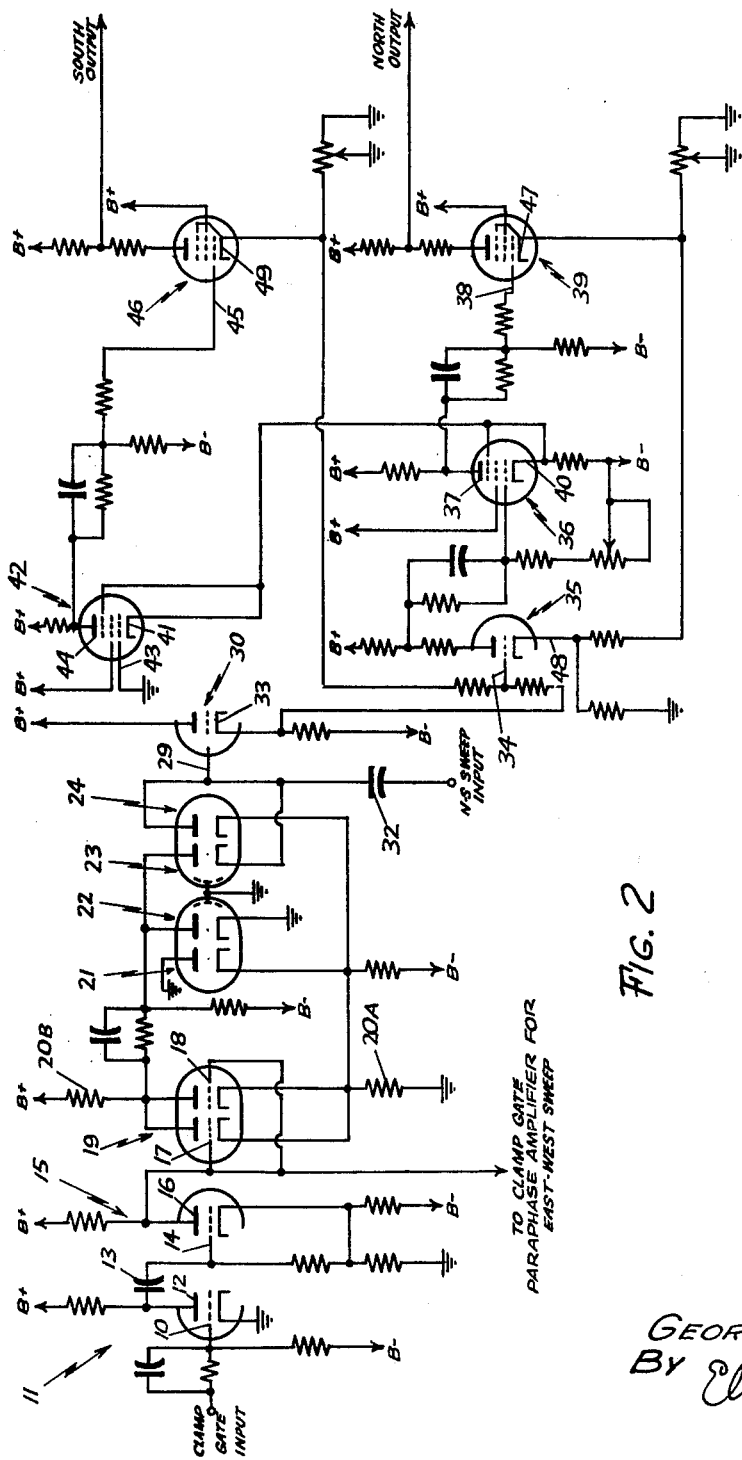
Fig. 2 is a schematic diagram of the block diagram illustrated in Fig. 1.

Referring now to Figs. 1 and 2, there is shown for the purpose of illustration only an embodiment of a class B sweep power amplifier, utilizing D.C. coupled feedback amplifiers. There is also illustrated a bidirectional clamping circuit at the input to said class B sweep amplifiers for the purpose of starting said sweep at the center of the P.P.I. tube. For the sake of completeness, Fig. 1 illustrates the complete east-west and north-south sweep amplifiers. It will be noted that both the east-west and the north-south amplifiers are exactly alike, and it is for this reason that Fig. 2 merely illustrates the schematic of the north-south sweep amplifiers. It should be understood that the complete schematic would include an identical set of amplifiers shown in Fig. 2. Careful examination of both Fig. 1 and Fig. 2 will show that the complete amplifier can be divided into three parts that include a clamp gate amplifier, a bidirectional clamping circuit and a sweep power amplifier driving a coil wherein a sweep voltage is produced.

A clamp gate signal is fed from an external source to grid 10 of clamp gate amplifier 11. The output signal from plate 12 is capacitively coupled by capacitor 13 to grid 14 of the second clamp gate amplifier 15. The signal from plate 16 of the second clamp gate amplifier 15 is fed to grids 17 and 18 of paraphase amplifier 19 and also to the grids of paraphase amplifier 20. Paraphase amplifier 20 is in the east-west sweep circuit, while paraphase amplifier 19 is in the north-south sweep circuit. Since the operation of both paraphase amplifiers 19 and 20 is identical, only the operation of the north-south paraphase amplifier will be described. The paraphase amplifiers 19 and 20 are phase splitters of a type wherein the cathode resistor 20A and the plate load resistor 20B are equal. It is to be understood that any efficient phase splitter may be used.

Bidirectional clamps 21, 22, 23, and 24 provide a method of reinserting the zero level between sweeps. The input to the bidirectional clamps is fed, direct-coupled, from clamp gate paraphase amplifier 19. The output of the bidirectional clamp is direct-coupled to grid 29 of cathode follower 30 for the north-south amplifier. In a like manner, paraphase amplifier 20 feeds bidirectional clamps 25, 26, 27, and 28, which in turn feed cathode follower 31 for the east-west sweep amplifiers. The north-south sweep input is capacitively coupled through capacitor 32 to grid 29. The east-west sweep input is fed to cathode follower 31 in a similar manner.

The actual sweep signals are generated in an external circuit and fed into the cathode follower stages 30 and 31. The cathode 33 of cathode follower 30 is directly coupled to grid 34 of sweep amplifier 35. The output of sweep amplifier 35 is directly coupled to sweep amplifier 36. The output signal of sweep amplifier 36 is taken from plate 37, which is directly coupled to grid 38 of the north sweep power amplifier 39. An output signal is also taken from cathode 40 of sweep amplifier 36 and is fed to cathode 41 of cathode coupled sweep amplifier 42. The grid 43 of sweep amplifier 42 is grounded. The output of sweep amplifier 42 is directly coupled from plate 44 to grid 45 of the south sweep power amplifier 46. This arrangement for driving sweep amplifier 42 produces an equal drive 180 degrees out of phase for the two sweep power amplifiers 39 and 46. Feedback from both sweep power amplifiers 39 and 46 is fed back to the first sweep amplifier 35 in proper phase. This feedback makes the sweep more linear. The proper phasing is accomplished by having sweep power amplifier 39 feed a signal back from cathode 47 to cathode 48 of sweep amplifier 35, while power amplifier 46 feeds a signal back from cathode 49 to grid 34 of sweep amplifier 35, thereby insuring that the feedback signal will have the proper phase relationship.

The east-west amplifiers consisting of sweep amplifier 50, sweep amplifier 51, cathode coupled sweep amplifier 52, and sweep power amplifiers 53 and 54 are constructed and operate in the manner just described for the north-south sweep amplifiers.

The operation of sweep power amplifiers operated in class B is such that, with no signal applied to either sweep power amplifier 39 or 46, the plate current will be approximately 10 milliamps. When a north-south signal is applied, the plate current of the north sweep power amplifier 39 will rise to approximately 200 milliamps. When the plate current of the north sweep power amplifier 39 rises to 200 milliamps, the plate current of the south sweep power amplifier 46 will be zero. When a south-north signal is applied, the reverse action takes place. The operation of the east and west sweep power amplifiers 53 and 54 operate in a similar manner.

It will be noticed that the D.C. level is reinserted by the bidirectional clamping circuit consisting of stages 21, 22, 23 and 24 before the sweep feedback amplifier 35. This is necessary since all the amplifiers are D.C. coupled and the D.C. level must be reinserted in order to have each sweep start at the center of the P.P.I. The clamp is released for the duration of the sweep by an unclamping gate that is derived from the original sweep gate thereby insuring the proper timing relationship between the sweep input and the clamp gate input.

Figure 3:
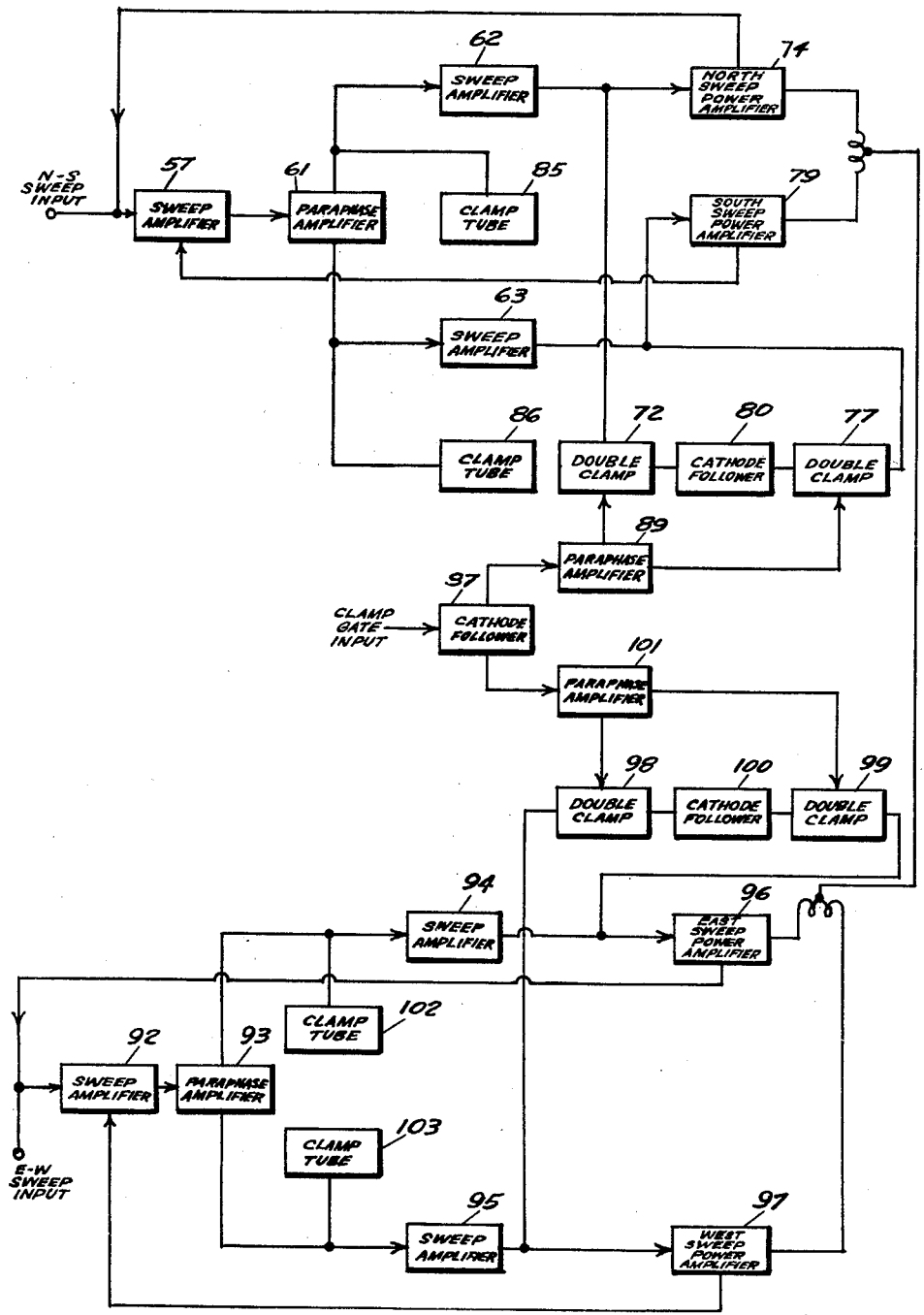
Fig. 3 is a block diagram of another embodiment of the invention.

Referring now to Figs. 3 and 4, there is shown another embodiment of the present invention wherein the sweep amplifiers are all A.C. coupled and the D.C. level is inserted in the last power amplifier stage by a bidirectional clamping circuit. In A.C. coupled amplifiers the D.C. level does not change, so it is therefore unnecessary to insert a D.C. level at the input of the sweep amplifiers. The reason for inserting a clamping circuit at the output of the sweep amplifier is due to the P.P.I. presentation wherein the sweep must start from the center of the scope and a proper D.C. level is necessary to accomplish this result. The clamp is released for the duration of the sweep by an unclamping gate that originates from the same source that supplies the sweep signal. Fig. 3 shows four sweep power amplifiers in two pairs of push-pull operation for the four deflection coils north, south, east and west. The block diagram on Fig. 3 illustrates all four deflection coils, but since the east-west is identical to the north-south deflection circuits, only the north and south amplifiers are shown in schematic form in Fig. 4.

The north-south sweep input is fed through capacitor 55 to grid 56 of sweep amplifier 57. The output of sweep amplifier 57 is capacitively coupled from plate 58 through capacitor 59 to grid 60 of paraphase amplifier 61. Paraphase amplifier 61 drives sweep amplifiers 62 and 63, which are 180° out of phase with each other. Plate 64 of paraphase amplifier 61 is capacitively connected through capacitor 65 to grid 66 of sweep amplifier 62. Cathode 67 of paraphase amplifier 61 is capacitively coupled by capacitor 68 to grid 69 of sweep amplifier 63, thereby accomplishing the 180° phase shift between amplifiers 62 and 63. The output of sweep amplifier 62 is taken from plate 70 through capacitor 71 and thence through a balanced double-diode clamping circuit 72, consisting of diodes 72A, 72B, 72C and 72D, to grid 73 of the north sweep power amplifier 74. The purpose of the balanced double-diode clamping circuit 72 is to provide a method of reinserting the zero level between signals.

The output of sweep amplifier 63 is fed from plate 75 through capacitor 76 through a balanced double-diode clamping circuit 77, consisting of diodes 77A, 77B, 77C and 77D, to grid 78 of the south sweep power amplifier 79. A voltage control cathode follower circuit 80, consisting of cathode followers 80A and 80B, provides a voltage control for centering purposes.

Feedback from both north and south sweep power amplifiers 74 and 79 is fed back to the first sweep amplifier stage 57, 180° out of phase, in order to make the sweep more linear in both the high and low voltage directions. The feedback signal from north sweep power amplifier 74 is taken from cathode 81 to capacitor 55 and then to grid 56 of sweep amplifier 57. The feedback signal from south sweep power amplifier 79 is fed from cathode 82 to cathode 84 of sweep amplifier 57, thereby insuring the proper phase relationship between both feedback signals.

Clamp tube 85 is connected to grid 66 of sweep amplifier 62 in the same manner that clamp 86 is connected to grid 69 of sweep amplifier 63. These two clamp tubes 85 and 86 serve as a preventive measure, in order to prevent excessive voltage excursions on grids 66 and 69, thereby eliminating any unstable conditions that might exist within these two amplifier circuits.

A clamp gate signal is fed to cathode follower 87, which is not illustrated in Fig. 4. The output of cathode follower 87 is fed to grid 88 of paraphase amplifier 89. The output of paraphase amplifier 89 is fed into the two balanced double diode clamping circuits 72 and 77, from a point 90, which is tied to the plates of paraphase amplifier 89. The second output from paraphase amplifier 89 is taken from a point 91, which is connected to the cathodes of paraphase amplifier 89, and then fed to paraphase amplifiers 72 and 77 in the proper phase relationship. It can be seen, therefore, that in the circuits illustrated in Figs. 3 and 4 the amplifiers are A.C. coupled up to the grids of the sweep power amplifier stages 74 and 79. It is at this point that the bidirectional diode clamping circuits 72 and 77 hold the output tubes biased to cut-off in the absence of a signal.

The east-west sweep signals comprising sweep amplifier 92, paraphase amplifier 93, sweep amplifiers 94 and 95, east sweep power amplifier 96, west sweep power amplifier 97, double clamp circuits 98 and 99, cathode follower 100, paraphase amplifier 101, and clamp tubes 102 and 103 are all constructed and operated in a similar manner as just described for the north-south sweep circuits.

This completes the description of the embodiments of the invention illustrated herein. However, many modifications and advantages thereof will be apparent to persons skilled in the art without departing from the spirit and scope of this invention. For example, any other type of phase splitter can be used instead of paraphase amplifiers and also other types of clamping circuits other than the bidirectional clamps may be used. Accordingly, it is desired that this invention not be limited to the particular details of the embodiments disclosed herein, except as defined by the appended claims.

What is claimed is:

1. In combination, means for producing a sweep current in a coil, means for driving said coil directly from a push-pull amplifying means operating in class B, and dual means for obtaining a feedback signal from each of said push-pull amplifying means adapted to be connected to a single-ended input of said push-pull amplifying means for obtaining a linear sweep in said coil.

2. In combination, means for producing a sweep current in a coil, means for driving said coil directly from a push-pull amplifying means operating in class B, amplifying means connected to said push-pull amplifying means for driving said push-pull amplifying means, said amplifying means to include a first single-ended amplifier driving a phase splitter, and dual means for obtaining a feedback signal from each of said push-pull amplifying means connected to said first single-ended amplifier for obtaining a linear sweep in said coil.

3. In combination, means for producing a sweep current in a coil, means for driving said coil directly from a push-pull amplifying means operating in class B, amplifying means connected to said push-pull amplifying means for driving said push-pull amplifying means, said amplifying means to include a first single-ended amplifier driving a cathode coupled amplifier, and dual means for obtaining a feedback signal from each of said push-pull amplifying means connected to said first single-ended amplifier for obtaining a linear sweep in said coil.

4. In combination, means for producing a sweep current in a coil, means for driving said coil directly from a push-pull amplifying means operating in class B, direct coupled amplifying means connected to said push-pull amplifying means for driving said push-pull amplifying means, said direct coupled amplifying means to include a direct coupled single-ended amplifier driving a direct coupled phase splitter, and dual means for obtaining a feedback signal from each of said push-pull amplifying means connected to said direct coupled single-ended amplifier for obtaining a linear sweep in said coil.

5. In combination, means for producing a sweep current in a coil, means for driving said coil directly from a push-pull amplifying means operating in class B, amplifying means connected to said push-pull amplifying means for driving said push-pull amplifying means, said amplifying means to include a first single-ended amplifier driving a phase splitter, clamping means connected to the input of said direct-coupled amplifier for obtaining the proper voltage operating level in said coil, and dual means for obtaining a feedback signal from each of said push-pull amplifying means connected to said first single-ended amplifier for obtaining a linear sweep in said coil.

6. In combination, means for producing a sweep current in a coil, means for driving said coil directly from a push-pull amplifying means operating in class B, amplifying means connected to said push-pull amplifying means for driving said push-pull amplifying means, said amplifying means to include a first single-ended amplifier driving a phase splitter, a bidirectional balanced double diode clamping means, and dual means for obtaining a feedback signal from each of said push-pull amplifying means connected to said first single-ended amplifier for obtaining a linear sweep in said coil.

7. In combination, means for producing a sweep current in a coil, means for driving said coil directly from a push-pull amplifying means operating in class B, capacitively coupled amplifying means connected to said push-pull amplifying means for driving said push-pull amplifying means, said capacitively coupled amplifying means to include a capacitively coupled singled-ended amplifier driving a capacitively coupled phase splitter, and dual means for obtaining a feedback signal from each of said push-pull amplifying means connected to said capacitively coupled singled-ended amplifier for obtaining a linear sweep in said coil.

8. In combination, means for producing a sweep current in a coil, means for driving said coil directly from a push-pull amplifying means operating in class B, capacitively coupled amplifying means connected to said push-pull amplifying means for driving said push-pull amplifying means, said capacitively coupled amplifying means to include a capacitively coupled single-ended amplifier driving a capacitively coupled phase splitter, clamping means connected to the input of said push-pull amplifying means for obtaining the proper voltage operating level in said coil, and dual means for obtaining a feedback signal from each of said push-pull amplifying means connected to said capacitively coupled single-ended amplifier for obtaining a linear sweep in said coil.

9. In combination, means for producing a sweep current in a coil, means for driving said coil directly from a push-pull amplifying means operating in class B, capacitively coupled amplifying means connected to said push-pull amplifying means for driving said push-pull amplifying means, said capacitively coupled amplifying means to include a capacitively coupled single-ended amplifier driving a capacitively coupled phase splitter, a bidirectional balanced double diode clamping means connected to the input of said push-pull amplifying means for obtaining the proper voltage operating level in said coil, and dual means for obtaining a feedback signal from each of said push-pull amplifying means connected to said capacitively coupled single-ended amplifier for obtaining a linear sweep in said coil.

References Cited in the file of this patent

UNITED STATES PATENTS

| 2,393,601 | Baldwin, Jr. | Jan. 29, 1946 |
|---|---|---|
| 2,439,324 | Walker | Apr. 6, 1948 |
| 2,466,712 | Kenyon | Apr. 12, 1949 |
| 2,516,181 | Bruene | July 25, 1950 |
| 2,516,797 | Oliver | July 25, 1950 |
| 2,531,458 | Nye | Nov. 28, 1950 |
| 2,554,279 | Tharp | May 22, 1951 |
| 2,606,304 | Moore | Aug. 5, 1952 |
| 2,660,691 | Bertram | Nov. 24, 1953 |

OTHER REFERENCES

Radar System Engineering (Ridenour), published by McGraw-Hill, 1947, page 507 relied on.

Cathode Ray Tube Displays (Soller, Starr and Valley), published by McGraw-Hill, 1948, page 131 relied on.

Van Nostrand Co., "The International Dictionary of Physics and Electronics," 1956, page 29.